Aug. 20, 1946.   E. W. ROGERS ET AL   2,406,105
MEAT GRINDER ATTACHMENT
Filed June 12, 1945
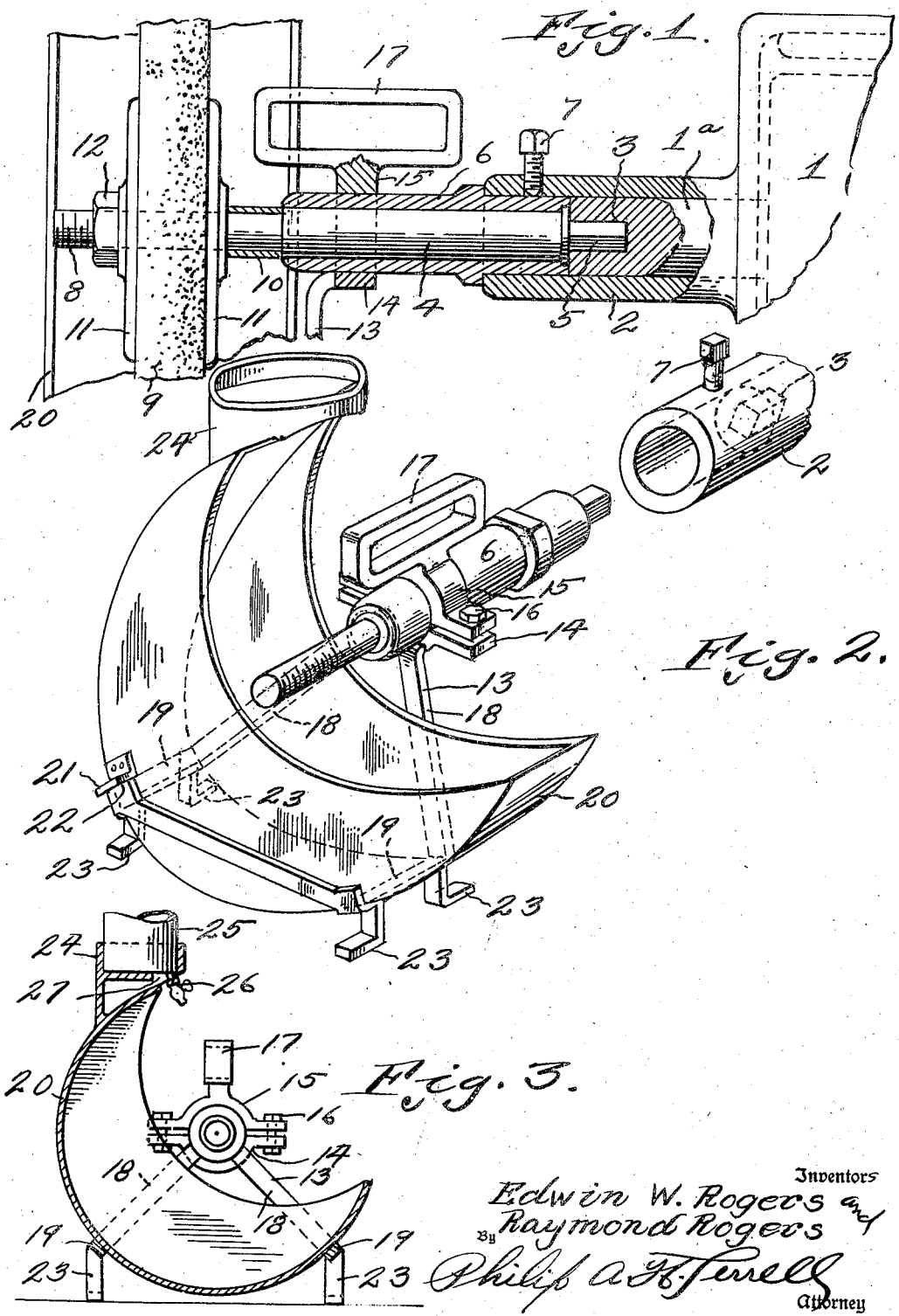
Inventors
Edwin W. Rogers and
Raymond Rogers
By Philip A. H. Terrell
Attorney Patented Aug. 20, 1946

2,406,105

UNITED STATES PATENT OFFICE 2,406,105

MEAT GRINDER ATTACHMENT

Edwin W. Rogers and Raymond Rogers,
Alexandria Bay, N. Y.

Application June 12, 1945, Serial No. 598,980

2 Claims. (Cl. 51—241)

The invention relates to attachments for meat grinders, and has for its object to provide a portable attachment which may be easily and quickly attached to the motor shaft of a meat grinder and utilized for grinding and sharpening butcher knives and the like.

A further object is to drive the grinding stone by an elongated shaft adapted to extend through the meat grinding casing so that the stone will be positioned to the outside of the meat grinding casing after the worm has been removed from the meat grinder.

A further object is to mount the stone on the shaft rotatably mounted in a sleeve, and adapted to be received and held against rotation in the motor shaft bearing with the elongated shaft engaging in a socket in the motor shaft.

A further object is to provide a supporting rack for the sleeve and elongated shaft, and to construct the rack for the reception of an arcuately shaped grinding wheel guard supported in the bottom of the rack, detachably, so the shield can be placed in a right or left hand position for grinding from either side of the grinding wheel.

A further object is to provide the shield with a stop cooperating with the rack at opposite sides thereof according to the right or left hand position of the shield.

A further object is to provide the rack above the extension shaft sleeve with a handle member so the attachment can be easily handled during an attaching or detaching operation.

A further object is to provide the upper end of the shield with a water receptacle receiving member which will discharge water onto the grinding wheel when the shield is in either a right or left hand position.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of the device, parts being shown in vertical longitudinal sectional view, to better illustrate the device.

Figure 2 is a perspective view of the attachment, showing the same in position to be attached to the meat grinder motor.

Figure 3 is a vertical transverse sectional view through the attachment.

Referring to the drawing the numeral 1 designates the motor of a meat grinding machine, from which the casing and grinding worm in the casing has been removed. In this type of machine the motor shaft 1a extends into a bearing sleeve 2 and is provided with a rectangularly shaped recess 3 for the reception of a similarly shaped portion on the grinding worm.

In the present invention, when it is desired to sharpen knives the grinding machine worm is removed along with its casing and an elongated shaft 4, provided with a reduced rectangular shaped portion 5, is placed in the recess 3 along with the bearing sleeve 6, in which the shaft 4 rotates and the sleeve is firmly held in the bearing sleeve 2 by means of a set screw 7. Shaft 4 is provided with a reduced portion 8 on which the grinding wheel 9 is mounted, and this grinding wheel is clamped in position against a spacing sleeve 10 by discs 11, and the nut 12, therefore it will be seen that the grinding wheel will be positively driven when the motor is in operation, and the shaft 4 is relatively long, thereby spacing the grinding wheel a substantial distance from the motor.

The above mechanism is supported in a rack 13, which comprises a lower yoke section 14 and an upper yoke section 15, which is clamped around the sleeve 6, by means of bolts 16. The upper yoke section 15 is provided with a handle member 17 adapted to be grasped by the operator in assembling the attachment to the motor, or for transporting the same from place to place. Rack 13 comprises downwardly diverging arms 18 which terminate in outwardly diverging arms 19 on which the arcuately shaped grinding shield 20 rests and is detachably supported so it can be reversed in position so that the grinding operation can take place from either side of the grinding wheel 9. One side of the shield 20 is provided with an upwardly extending lug 21, which is adapted to engage opposite sides of the rack for maintaining the shield 20 in position, no matter to which side of the wheel it is placed. In one position it engages the shoulder 22 and in the opposite position it engages the arm 18. Extending downwardly from the arms 19 are angularly shaped supporting legs 23 for supporting the rack in position on a counter adjacent the grinding machine or any place where it may be stored.

The upper end of the shield 20 is provided with a cylindrically shaped extension 24 for the reception of a water receptacle 25 having a pet cock 26 thereon, which pet cock extends through an opening 27 so that water will be discharged onto the grinding wheel during a grinding operation.

From the above it will be seen that a grinding attachment is provided for meat grinders, which is simple in construction, may be easily attached and transported from place to place. The device may also be used as a general power take-off mechanism if desired.

The invention having been set forth what is claimed as new and useful is:

1. A grinding attachment adapted to be attached to a motor, said attachment comprising a rotatable shaft, said shaft being rotatably mounted in a stationary sleeve adapted to be attached to a driving motor, the outer end of said shaft being adapted to receive a grinding wheel, a combined support for said sleeve and shaft and a shield, said support comprising a separable bracket member carried by the sleeve, said bracket member having downwardly diverging arms, the lower ends of said arms terminating in a forwardly off-set cradle, an arcuate shield supported in said cradle and support engaging legs carried by said cradle and adapted to support the shaft in a horizontal position.

2. A device as set forth in claim 1 comprising an outwardly extending lug carried by the outer side of the shield and engaging one side of the outer side of the cradle and positioned whereby the lug will engage the other side of the cradle when the position of the shield is reversed.

EDWIN W. ROGERS.
RAYMOND ROGERS.